United States Patent
Zick

[11] Patent Number: 6,009,533
[45] Date of Patent: Dec. 28, 1999

[54] SPECULATIVE BUS CYCLE ACKNOWLEDGE FOR 1/2X CORE/BUS CLOCKING

[75] Inventor: Kenneth M. Zick, Dallas, Tex.

[73] Assignee: VIA-Cyrix, Inc., Richardson, Tex.

[21] Appl. No.: 09/089,275

[22] Filed: Jun. 2, 1998

[51] Int. Cl.[6] .............................. G06F 1/06; G06F 13/14
[52] U.S. Cl. ............................. 713/501; 710/109
[58] Field of Search .................... 713/400, 500, 713/501; 710/36, 40, 46, 100, 107, 109

[56] References Cited

U.S. PATENT DOCUMENTS

| | | | |
|---|---|---|---|
| 5,276,818 | 1/1994 | Okazawa et al. | 710/114 |
| 5,396,599 | 3/1995 | Cobbs et al. | 710/100 |
| 5,621,901 | 4/1997 | Morriss et al. | 710/126 |
| 5,623,646 | 4/1997 | Clarke | 713/601 |
| 5,742,847 | 4/1998 | Knoll et al. | 710/46 |

Primary Examiner—Thomas M. Heckler
Attorney, Agent, or Firm—Carr & Ferrell LLP

[57] ABSTRACT

In a microprocessor, a speculative acknowledge/rescue scheme is implemented in the bus controller to increase bus cycle performance for ½X clocking. For the odd cycles of the bus controller clock that result from ½X clocking, bus cycle requests from the cache controller, which ordinarily cannot be acknowledged in the same bus controller clock as received (even though the bus cycle can still be run the that clock), are speculatively acknowledged. If the bus controller cannot run the bus cycle in that clock, rescue is initiated in which the bus cycle request is resubmitted in the next clock. In an exemplary embodiment, snoop write back requests are prioritized such that a pending rescue bus cycle will be stalled until the snoop write back request is completed. The speculative acknowledge/rescue scheme is advantageous in minimizing any adverse impact on performance by minimizing the number of unacknowledged bus cycle requests during odd clock cycles created by ½X clocking.

5 Claims, 4 Drawing Sheets

SPECULATIVE BUS CYCLE ACKNOWLEDGE FOR 1/2X CORE/BUS CLOCKING

BACKGROUND

1. Technical Field

The invention relates generally to computer systems, and more particularly relates to a processor that uses a core clock that is a ½X multiple of the system clock.

In an exemplary embodiment, the invention is used in an x86 processor to interface a processor core with a 233 or 300 MHz core clock to a bus controller operating at a 66 MHz system clock frequency.

2. Related Art

Current microprocessor designs typically use a core clock rate that is some multiple of the bus or system clock rate. For example, in a computer system with a 66 MHz system clock, a 4X core clock will enable the microprocessor to run at 266 MHz.

For microprocessors employing clock multiplication, the bus controller (bc) provides an interface between the microprocessor core and the external system. Clock generation circuitry receives the input bus/system clock, and generates both a bc clock at the bus clock frequency, and a multiplied core clock—the bc operates internally with the bc clock, and interfaces to the external bus at the bus clock frequency, and to the core at the core clock frequency.

Without limiting the scope of the invention, this background information is provided in the context of a specific problem to which the invention has application: in a microprocessor, interfacing the bus controller to the execution core when the core is using a core clock that is a ½X multiple of the bc clock.

Clock generators able to provide a core clock that is an integer multiple of an input bus/system clock are straightforward in that the rising edge of the bus clock is synchronized with the rising edge of multiplied core clock.

Even in the case of two phase designs, all clock edges are synchronized. Two phase microprocessor designs use separate ph1 and ph2 core clocks that are 180 degrees out of phase—the separate ph1/ph2 clocks are used to clock different sets of ph1 and ph2 latches in the core logic. Some microprocessors use a two phase design for the bus controller also, so that the bc uses bph1 and bph2 clocks at the bus clock frequency (which clock bph1 and bph2 latches in the bc logic).

Incorporating clock generation support for ½X clocking is advantageous in providing flexibility to the computer system designer. For example, in the case of a 66 MHz bus/system clock, the computer system designer could offer both a 4X clocked 266 MHz system and/or a 4.5X clocked 300 MHz system.

One-half X clocking is problematic in that not all of the clock edges of the bus and multiplied core clocks are in sync. Thus, in the case of a two phase microprocessor design, for even clock cycles of the bc clocks, the rising edges of the core clocks ph1/ph2 are in phase with the rising edges of the corresponding bc clocks bph1/bph2, but for odd clock cycles of bph, the rising edges of the bc clocks occur on corresponding falling edges of the core clocks (i.e., the core and bus clocks are out of phase by approximately ½ of a core clock period).

This lack of synchronization between core and bus clocks is illustrated in FIG. 2 (bph1 and ph1)—it can have a significant impact on interface timing (hand shaking) between the core and bc logic. For example, data accesses by the execution core are typically presented to an L1 (level 1) cache—if the cache accesses misses, the cache controller requests that the bus controller run an external bus cycle to retrieve the data.

In the case of out-of-phase (odd) bc clock cycles, a ½ clock difference can have significant ramifications. For example, when the bc receives a bus cycle request from the cache controller, it will typically run the bus cycle in the same clock as the request is received, and at the same time acknowledge to the cache controller that it has received the request and run the bus cycle—the cache controller is then able to issue another bus cycle request to the bc in the next clock without having to re-run (or re-prioritize) an unacknowledged request.

Thus, if the bc delays acknowledging the first request for ½ clock, performance will be adversely impacted because the cache controller will have to re-run (possibly with reprioritization) the unacknowledged request (thus introducing additional delays in supplying requested data to the execution core). If the cache controller is allowed to issue a second request without waiting for the first request to be acknowledged, then additional logic would have to be included in the cache controller to determine whether the next acknowledgement is for the first or second bus cycle request.

SUMMARY

Objectives of the invention include providing interface logic that supports ½X clocking, for example in the context of a microprocessor in which the core logic operates at a core clock that is a ½X multiple of the bus controller clock, while minimizing any adverse impact on performance by minimizing the number of unacknowledged bus cycle requests during odd clock cycles where the core and bc clock are out of phase.

These other objectives of the invention are achieved by a ½X clocking scheme in which requests from one logic block can be speculatively acknowledged by another logic block.

In one aspect of the invention, an integrated circuit includes first and second logic blocks, with the second logic block selectively issuing requests to the first logic block which in response performs an associated requested operation. A clock generator generates a first clock used by the first logic block, and a second clock that is a ½X multiple of the first clock used by the second logic block—each clock is characterized by defined clock edges such that the clocks are in phase when respective clock edges are synchronized and are out of phase when respective clock edges are not synchronized.

Acknowledge logic in the first logic block receives a request from the second logic block, and returns a corresponding acknowledge signal to the second logic block indicating that the request has been received and the associated requested operation is being performed.

In response to selected requests for which the first and second clocks are not in phase, speculative acknowledge logic returns a speculative acknowledge signal to the second logic block that is detected as an acknowledge signal. If a speculatively acknowledged request does not result in the corresponding performance of the associated requested operation by the first logic block by substantially the beginning of the next cycle of the first clock, then the rescue logic resubmits the request until the first logic block performs the associated requested operation.

In another aspect of the invention, the invention is implemented in a processor that is coupled to a bus that operates at a bus clock frequency. The processor includes a processor core and a bus controller coupled to the bus—the processor core selectively issues bus cycle requests to the bus controller which in response issues associated bus cycles.

A clock generator that receives an input clock at the bus clock frequency, and generates a bc clock used by the bus controller which corresponds in frequency to the bus clock, and a core clock used by the processor core that is a ½X multiple of the bc clock—each clock is characterized by defined clock edges such that the clocks are in phase when respective clock edges are synchronized and are out of phase when respective clock edges are not synchronized.

In response to a bus cycle request, acknowledge logic in the bus controller returns a corresponding acknowledge signal indicating that the bus cycle request has been received and the associated bus cycle is being run. The bus controller also includes speculative acknowledge logic and rescue logic.

In response to selected bus cycle requests for which the bc clock and the processor core clock are not in phase, the speculative acknowledge logic returns a speculative acknowledge signal to the processor core that is detected as an acknowledge signal. If a bus cycle request for which the speculative acknowledge logic returns a speculative acknowledge signal does not result in a corresponding bus cycle being run by the bus controller by substantially the beginning of the next cycle of the bc clock, then the rescue logic resubmits the bus cycle request until the bus controller runs the associated bus cycle.

In an exemplary embodiment, snoop write back cycles are prioritized such that, if a pending rescue of a speculatively acknowledged bus cycle request will be stalled until after the priority snoop write back request has been run, at which time rescue will continue.

Embodiments of the invention may be implemented to realize one or more of the following technical advantages of the invention. The use of speculative acknowledge and rescue enables one logic block (such as a bus controller) to speculatively acknowledge a request from another logic block (such as a processor core) when the associated clocks used by the logic blocks are not in phase, rather than delaying acknowledgement until the next clock edge in which the request would normally be acknowledged. Rescue logic handles those situations in which the speculatively acknowledged request is not performed immediately (at the next appropriate clock edge of the logic block performing the request). The use of the speculative acknowledge/rescue scheme of the invention improves performance and reduces complexity for interfacing logic blocks using ½X clocking.

For a more complete understanding of the invention, and for further features and advantages, reference is now made to the Detailed Description of an exemplary embodiment of the invention, together with the accompanying Drawings, it being understood that the invention encompasses any modifications or alternative embodiments that fall within the scope of the claims.

DETAILED DESCRIPTION

The detailed description of an exemplary embodiment of the speculative acknowledge/rescue scheme for ½X clocking, is organized as follows:

1. Processor Including Core/BC Logic With ½X Clocking
    1.1. Processor Core
    1.2. Bus Controller
2. Synchronizer/Acknowledge Logic
    2.1. Speculative Acknowledge
    2.2. Rescue
3. Conclusion This organizational outline, and the corresponding headings, are used in this Detailed Description for convenience of reference only.

The exemplary speculative acknowledge/rescue scheme for ½X clocking is used in an x86 processor to interface a processor core to a bus controller where the processor core operates with a core clock that a ½X multiple of the bc clock. Detailed descriptions of conventional or known aspects of microprocessor systems are omitted so as to not obscure the description of the invention. In particular, terminology specific to the x86 microprocessor architecture is known to practitioners in the microprocessor field, as is the basic design and operation of such microprocessors and of computer systems based on them.

1. Processor Including Core/BC Logic With ½X Clocking

Figure 1:
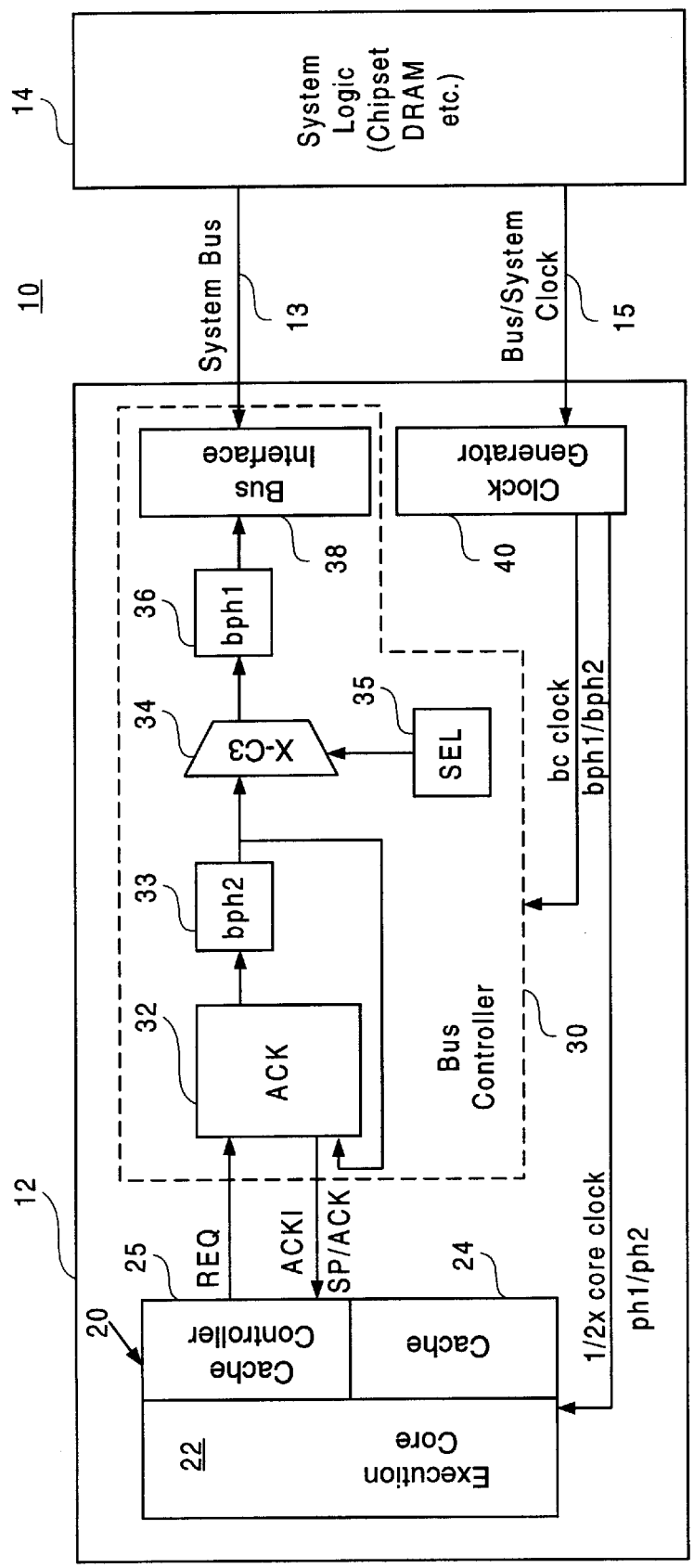
FIG. 1 illustrates an exemplary computer system, including a microprocessor that uses ½X clocking for a processor core and bus controller, which in accordance with aspects of the invention are interfaced through acknowledge logic that supports speculative acknowledge and rescue.

FIG. 1 illustrates an exemplary computer system 10, including a microprocessor 12 coupled over a system bus 13 to system logic 14 (chipset, DRAM, etc.). Microprocessor 12 includes a processor core 20, a bus controller 30, and a clock generator 40.

For the exemplary embodiment, both the processor core 20 and bus controller 30 use conventional two phase clocking. Clock generator 40 generates separate internal two phase clocks for input to these blocks: (a) a two phase be clock bph1 and bph2 for the bus controller, and (b) a two phase core clock ph1 and ph2 for the processor core.

System logic 14 provides a bus/system clock 15 to the microprocessor 12, which is input to the clock generator 40—the frequency of the bus/system clock corresponds to the frequency of the system bus 13 (for example, 66 MHz). From the bus/system clock, the clock generator generates two internal clocks: (a) a be clock with a frequency equal to the bus/system clock which is input to the bus controller 30, and (b) a multiplied core clock with a frequency that is a ½X multiple of the bc clock (for example, 2.5X or 166 MHz).

Figure 2:
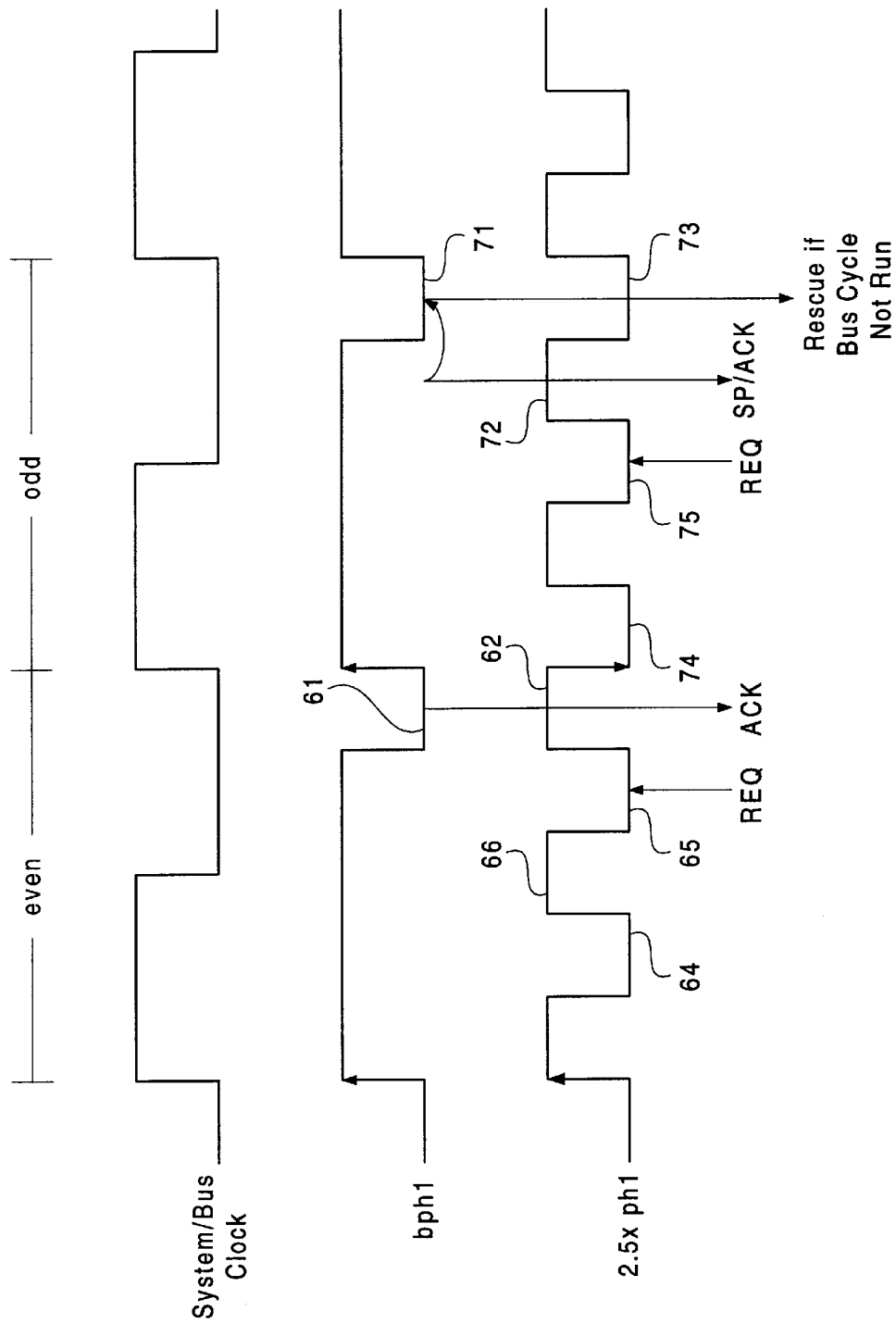
FIG. 2 illustrates timing diagrams for the core and bus clocks, as well as speculative acknowledge.

FIG. 2 illustrates timing diagrams for the two-phase core and bc clocks, in comparison to the input bus/system clock. In accordance with conventional two phase clocking, the two phase clocks ph1/ph2 and bph1/bph2 are identical in frequency and ½ clock out of phase—the two phase clocks are used to clock separate sets of latches. FIG. 2 shows only timing diagrams for bph1 and ph1—the relationship of bph2 and ph2 is identical.

1.1. Processor Core

Referring to FIG. 1, the processor core 20 includes an execution core 22 and cache/cache controller logic 24/25. From above, the processor core is clocked by a two phase core clock ph1/ph2 generated by clock generator 40.

Data/Code accesses by the execution core are presented to the cache 24—if the cache access misses, the cache controller 25 issues a bus cycle request to a bus controller 30, which returns an acknowledge signal if the bus cycle is run. Additionally, the cache controller may request write back bus cycles in response to snooping, or noncacheable bus cycles such as LOCK (read-modify-write back) cycles.

Referring also to FIG. 2, for the exemplary microprocessor design, cache controller issues bus cycle requests to the bus controller when the core clock ph1 is low, and it looks for an acknowledge signal when the core clock next goes high. If the bus controller 30 does not return an acknowledgement, the cache controller will then, when ph1 next goes low, either request the same the bus cycle, or reprioritize and request another bus cycle.

Note that, as a result of ½X clocking, even and odd clock cycles are defined, where an even clock cycle is one in which the rising edge of the bus/system clock is synchronized to a rising edge of the core clock ph1, while an odd clock cycle is one in which the rising edge of the bus/system clock is synchronized to a falling edge of the core clock.

1.2. Bus Controller

Referring to FIG. 1, the bus controller 30 includes synchronizer/acknowledge logic 32 which synchronizes the bus cycle request/acknowledge interface between the processor core 20 and the bus controller. The bus controller is clocked by a two phase core clock bph1/bph2 generated by clock generator 40.

Bus cycle requests are passed from the synchronizer/acknowledge logic 32 to a bph2 latch 33 for input to a bus cycle mux 34. The output of the bus cycle mux is latched by a bph1 latch 36 for input to a bus interface unit 38. The bus interface unit interfaces the bus controller 30 to the system bus 13, driving out bus cycle onto the system bus.

Referring also to FIG. 2, the two phase bc clock input to the bus controller 30, represented by the bph1 timing diagram, has the same frequency as the input bus/system clock. Thus, the bc clock also defines alternating even and odd clock cycles, where in even clock cycles the rising edge of the bc clock bph1 is synchronized to a rising edge of the core clock ph1, while in odd clock cycle the rising edge of bph1 is synchronized to a falling edge of the core clock.

To provide synchronization with the higher frequency core clock ph1, unlike the bus/system clock, the bc clock does not have a 50% duty cycle. Instead, the bc clock bph1 has a rising edge synchronized to the rising edge of the bus/system clock, but the falling edge of the bc clock is synchronized to the edge of the core clock immediately preceding the next rising edge of the bc clock. For even clock cycles, the falling edge of bph1 is synchronized with a rising edge of ph1, and for odd clock cycles, the falling edge of bph1 is synchronized with a falling edge of ph1.

In accordance with aspects of the invention, the synchronizer/acknowledge logic 32 includes logic to implement speculative acknowledge and rescue operations.

2. Synchronizer/Acknowledge Logic

Figure 3:
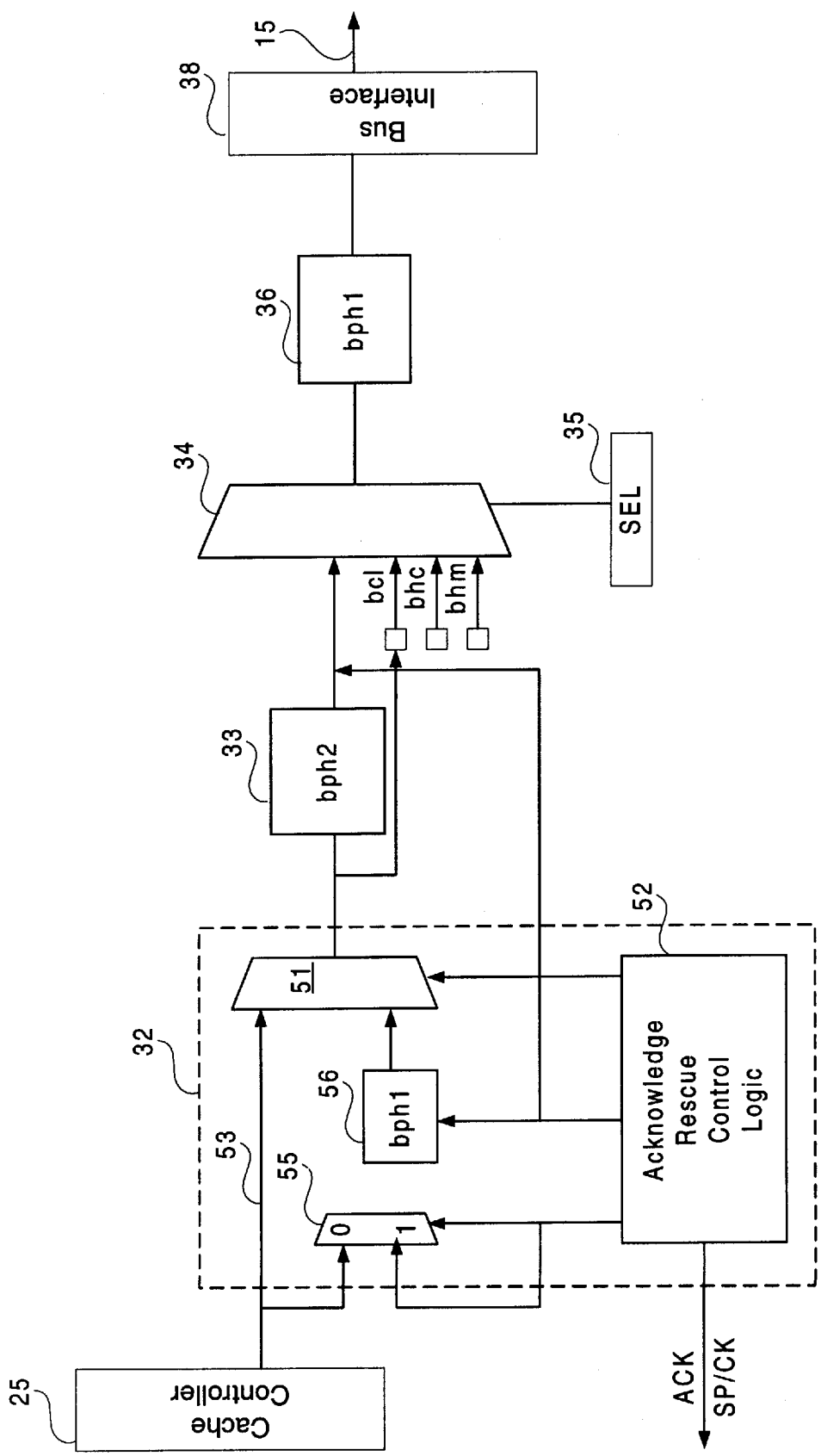
FIG. 3 illustrates the exemplary acknowledge logic in greater detail, including speculative acknowledge/rescue logic according to aspects of the invention.

FIG. 3 illustrates the exemplary synchronizer/acknowledge logic 32, including a bus cycle synchronizer mux 51 and acknowledge/rescue control logic 52. The synchronizer mux 51 is controlled by the acknowledge/rescue control logic to synchronize the interface between the bus controller and cache controller 25.

The synchronizer mux 51 selects between two bus cycle paths: (a) a pass-through path 53, and (b) an odd cycle/ rescue path through rescue mux 55 and gated bph1 latch 56 (which normally introduces a one half core clock delay). The acknowledge/rescue logic 52 controls the rescue mux and the gated bph1 latch 56, as well as the synchronizer mux 51 the bph1 latch 56 is gated to support snoop write back during rescue mode.

The acknowledge/rescue control logic selects the bus cycle requests that are passed through the synchronizer mux 51 to the bph2 latch 33 for presentation to the bus cycle mux 34. For the exemplary embodiment, the acknowledge/rescue control logic controls four modes of operation of the synchronizer/acknowledge logic 32:

Normal Acknowledgement For Even Cycle Requests

Speculative Acknowledgement For Odd Cycle Requests (Section 2.1)

Rescue For Speculatively Acknowledged Requests (Section 2.2)

Snoop Write-Back During Rescue (Section 2.2)

Bus cycle control is accomplished by controlling (a) the presentation of bus cycle requests through the synchronizer mux 51 and bph2 latch 33 to the bus cycle mux 34, and (b) the return of a bus cycle acknowledgement/speculative acknowledgement to cache controller 25.

For even cycles of the bc clock, bus cycle requests from the cache controller 25 will normally be passed through the synchronizer mux 51 to the bph2 latch 33 (ignoring the case of rescue mode), and the acknowledge/rescue control logic returns a normal acknowledgement to the cache controller. For odd cycles of the bc clock, under control of the acknowledge/rescue control logic, bus cycle requests from cache controller 25 will normally be routed through the rescue mux 55 and gated bph1 latch 56 for input to the synchronizer mux 51 (again, ignoring the case of rescue mode), and a speculative acknowledgement will be returned to the cache controller.

Referring also to FIG. 2, the falling edge of bph1 is in sync with a rising edge of the core clock ph1, and in particular the last rising edge of ph1 before the beginning of the following odd clock cycle of the bc clock bph1. Thus, the bc clock bph1 is low 61 while the core clock ph1 is high 62. For the exemplary embodiment, the bus controller (30 in FIG. 1) will only drive bus cycles onto the external system bus (15 in FIG. 1) at the rising edge of bph1 (i.e., after the low period 61 of a bc clock).

Recall that, for the exemplary embodiment, the cache controller 25 issues bus cycle requests while the core clock ph1 is low, and looks for acknowledgement from the bus controller, synchronizer/acknowledge logic 32, in the following high period. Thus, for the even clock cycle indicated in FIG. 2, the cache controller can issue a bus cycle request in periods 64 and 65.

If a request issues in period 64 of ph1, the bus controller will not acknowledge the request because a bus cycle will not be run during the next high period 66 of ph1—the cache controller will then reissue (or reprioritize) the unacknowledged request. If a request issues in period 65 of ph1, the following high period 62 of ph1 corresponds to the low period 61 of the even bc clock cycle bph1, and the bus controller's synchronizer/acknowledge logic 32 will acknowledge the request (assuming the bus controller is able to drive the bus cycle onto the external system bus in that clock).

Thus, for even clock cycles, a bus cycle request is passed through the synchronizer mux 51 to the following bph2 latch 33 for input to the bus cycle mux 34. For the exemplary implementation, other inputs to this mux are: (a) bcc (bus current cycle) which is the same request held as the current cycle request, (b) bnc (bus next cycle) which is a next bus cycle request when pipelining is enable, and (c) bhm (bus hit modified) which is used for requests that result from snooping. The operation of the bus controller with respect to these inputs is not important to a description of the invention.

Assuming that selection logic 35 selects the bus cycle mux 34 input from the bph2 latch, the bus cycle request is latched into the bph1 latch 36 for input to the bus interface unit 38, and thence driven onto the external system bus 15 on the next rising edge of bph1. Note that the bph1 latch is clocked by the bph1 clock as shown in FIG. 2, which is synchronized with the ph1 core clock used by the cache controller 25 in issuing bus cycle requests.

When the bus cycle request is latched into the bph1 latch 36, indicating that it will be driven onto the external bus 15 in the next rising edge of bph1, synchronizer/acknowledge logic 32 returns an acknowledge signal to the cache controller. In particular, the acknowledge signal is generated by the acknowledge/rescue control logic 52.

2.1. Speculative Acknowledge

Referring to FIG. 2, for odd clock cycles of the bc clock bph1, in accordance with aspects of the invention, speculative acknowledge, and if necessary rescue, are selectively used to speculatively acknowledge bus cycle requests before the bus controller is able to drive the bus cycle request onto the external system bus.

Recall that for odd cycles of bph1, the rising edge of the bc clock bph1 is synchronized with a falling edge of the core clock ph1. As a result of using ½X clocking, for these odd cycles, the low period 71 of bph1 (during which the bus controller prepares to drive out a bus cycle on the next rising edge of bhp1) does not correspond to a high period 72 of ph1 (during which the cache controller expects to receive an acknowledgement), but rather with a low period 73 of ph1 (the last low before the beginning of the following even cycle of bph1). As in the case of even cycles of the bc clock bph1, the cache controller 25 can issue bus cycle requests during the low periods of the core clock ph1 74 and 75, as well as the last low period 73, that occur during the odd cycle of bph1—a bus cycle request during the low period 75 will not be serviced because it is too early (and therefore won't be acknowledged), while a bus cycle request that occurs during the last low period 73 which overlaps the low period 71 of bph1 is too late to be serviced during the current odd clock cycle of bph1 (and therefore won't be acknowledged).

For a conventional implementation of the bus controller, a bus cycle request during the low period 75 of core clock ph1, which is one half of a core clock early, would not be acknowledged by the bus controller because the following high period 72 during which the bus cycle request must be acknowledged is also one half core clock early (i.e., it does not correspond to the low period 71 of the bc clock bph1 in which the bus controller is able to drive out and conventionally acknowledge a bus cycle). Thus, in a conventional implementation, the cache controller would have to reissue (or reprioritize) the bus cycle request, resulting in a degradation in performance.

In accordance with aspects of the invention, the exemplary embodiment of the bus controller is able to improve performance for bus cycle requests issued during odd cycles of the bc clock that are one half core clock too early to be acknowledged (i.e., the low period 75 of bph1 which is one half core clock too early to be driven out onto the external system bus)—the exemplary bus controller incorporates speculative acknowledge and rescue logic to enable the bus controller to return a speculative acknowledgement, i.e., an acknowledgement in the corresponding high period 72 of ph1 occurring one-half core clock before the bus controller is actually able to run the requested bus cycle (during the low period 71 of bph1).

Referring also to FIG. 3, for odd cycles of the bc clock bph1, the synchronizer mux 51 selects the delay path for the bus cycle request through rescue mux 55 and gated bph1 latch 56. The operation of the rescue mux 55 is described in the Section 2.2—prior to any speculative acknowledgement of a bus cycle request, the rescue mux merely passes the received bus cycle request through to the gated bph1 latch 56.

During odd cycles of the bc clock, the acknowledge/rescue control logic detects when a bus cycle request is received one half core clock early (i.e., in the low period 75 of the core clock ph1), and determines whether such bus cycle request may be speculatively acknowledged. Recall that, for the exemplary embodiment, bus cycle requests received during low periods 74 or 73 of the core clock ph1 are not speculatively acknowledged.

Figure 4:
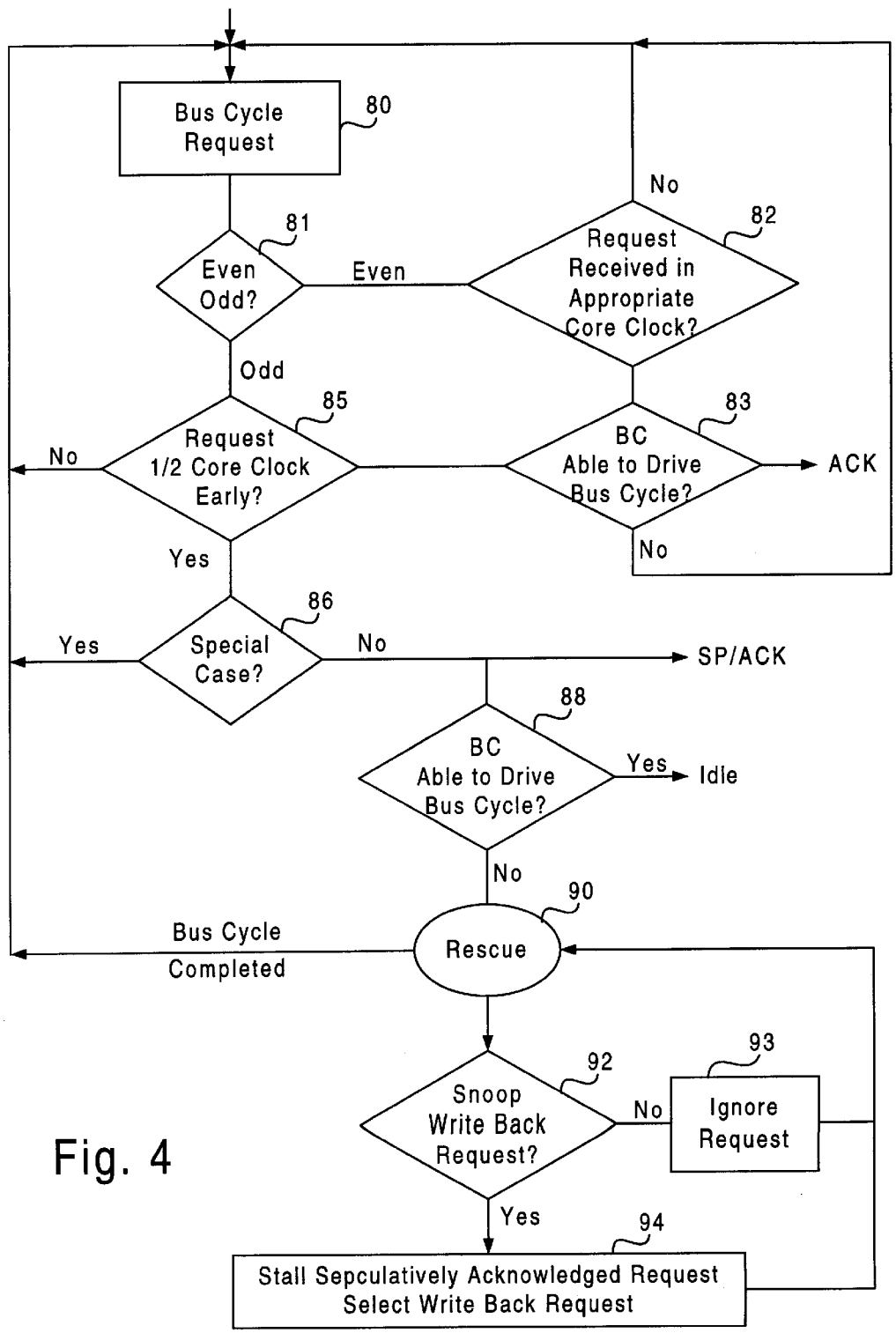
FIG. 4 is a flow diagram illustrating the operation of the acknowledge/rescue control logic.

FIG. 4 is a flow diagram illustrating the operation of the acknowledge/rescue control logic.52. A bus cycle request 80 received from the cache controller is first detected 81 as occurring in an even or odd bc clock cycle. For even cycles, the bus cycle request will be conventionally acknowledged if the acknowledge/rescue control logic (a) detects 82 that the bus cycle request occurs in the low period of the core clock ph1 that is one half clock before the bus controller normally drives out the bus cycle requests and returns acknowledgement (65 in FIG. 2), and (b) detects 83 that the bus controller will in fact drive out the bus cycle on the next rising edge of bph1 (after the high period 62 of ph1 corresponding to the low period 61 of bph1).

For odd cycles, the acknowledge/rescue control logic 52 will return a speculative acknowledgement if it (a) detects that the bus cycle request is one half core clock early (75 in FIG. 2), and (b) determines 86 that the bus cycle request is not a special case for which a speculative acknowledgement will not be returned. The designation of special bus cycle requests that will not be speculatively acknowledged is a purely a design choice—for the exemplary embodiment, the special cases are LOCK cycles and snoop write backs (other implementations may designate different requests, or may speculatively acknowledge all requests).

Referring to FIG. 3, for odd cycles of the bc clock bph1, synchronizer mux 51 selects the bus cycle request through the rescue mux 55 and gated bph1 latch 56. In the case of odd cycle requests that can be speculatively acknowledged, i.e., requests that are received one half core clock before the bus controller is able to drive the bus cycle, the gated bph1 latch effectively holds the bus cycle request for the one half core clock necessary for it to be latched into the bph2 latch 33 at the appropriate time for the request to be driven out by the bus controller.

Referring also to FIG. 2, a bus cycle request 75 that is one half core clock early must be held of one half core clock to synchronize it with the low period 71 of bph1 during which the bus controller prepares to drive out the bus cycle on the next rising edge of bhp1. The bph1 latch 56 accomplishes this delay by remaining high for the one half core clock period 72 between the request 75 and the low period 71 of bph1.

If the acknowledge/rescue control logic 52 detects 88 that the bus controller is in fact able to drive out the speculatively acknowledge bus cycle request, then the acknowledgement is complete. However, if the bus controller is not able to drive out the speculatively acknowledged bus cycle, then in accordance with aspects of the invention, rescue is required.

2.2. Rescue

Referring to FIGS. 3 and 4, a speculatively acknowledged bus cycle request latched into bph2 latch 33 is presented to bus cycle mux 34, and is also fed back to the synchronizer/acknowledge logic 32, specifically the rescue mux 55.

If the acknowledge/rescue control logic detects 88 that the speculatively acknowledged bus cycle request is not driven out by the bus controller, then it initiates a rescue mode 90 to resubmit the bus cycle request in the next cycle of bph1. Specifically, the acknowledge/rescue control logic selects via rescue mux 55 the fed-back speculatively acknowledged bus cycle request for input through the synchronizer mux 51 to the bph2 latch 33—thus, the speculatively acknowledge but not completed bus cycle request is resubmitted to the bus cycle mux 34 for input to the bus interface unit in the next cycle of bph1.

This rescue operation continues 90/92/93 until the speculatively acknowledged bus cycle is driven out by the bus controller. During rescue operations, new bus cycle requests from the cache controller will not be serviced. In particular, note that, with rescue pending, the pass-through path 53 for the synchronizer mux 51 remains deselected even for an even cycle of the bc clock bph1.

For the exemplary implementation of the invention, snoop write backs during rescue are handled as a special case, and are given the highest scheduling priority. If the acknowledge/rescue control logic 52 detects 92 a snoop write back request, it will stall the pending speculatively acknowledged request and select 94 the snoop write back request for scheduling into bus cycle mux 34.

To effect this snoop write back operation, the acknowledge/rescue control logic 52 (a) turns off the clock to the gated bph1 latch 56, and (b) selects the pass-through path 53 for the synchronizer mux 51. Turning off the clock to the gated bph1 latch has the effect of holding the pending rescue request in that latch.

Once the snoop write back request has been completed, the acknowledge/rescue logic returns to the rescue mode by (a) turning on the clock to the gated bph1 latch 56, and (b) selecting the rescue request pending in that latch for input through the synchronizer mux and bph2 latch 33 to the bus cycle mux 34. Recall that, for the exemplary implementation, snoop write back cycles are not speculatively acknowledged (and therefore rescue mode will not be re-entered during a snoop write back cycle that interrupts a rescue.

3. Conclusion

Although the Detailed Description of the invention has been directed to certain exemplary embodiments, various modifications of these embodiments, as well as alternative embodiments, will be suggested to those skilled in the art. For example, while the exemplary embodiment of the speculative acknowledge/rescue scheme for ½X clocking is describe in connection with supporting ½X clocking in a processor, the invention has application to interfacing between logic blocks using ½X clocking.

Logic is generally used in the hardware sense, recognizing that implementations involving microcode or other software routines would be equivalent. Cache organization (set associative/direct mapped) is a design choice. Various modifications based on tradeoffs between hardware and software logic will be apparent to those skilled in the art.

The invention encompasses any modifications or alternative embodiments that fall within the scope of the claims.

I claim:

1. An integrated circuit comprising, comprising:
   (a) first and second logic blocks, the second logic block selectively issuing requests to the first logic block which in response performs an associated requested operation;
   (b) a clock generator that receives an input clock at an input clock frequency, and generates a first clock corresponding in frequency to the input clock, and a second clock that is a ½X multiple of the first clock, with each clock being characterized by defined clock edges such that the clocks are in phase when respective clock edges are synchronized and are out of phase when respective clock edges are not synchronized;
   (c) the first logic block operating with the first clock, and the second logic block operating with the second clock;
   (d) acknowledge logic in the first logic block coupled to receive a request from the second logic block, and to return a corresponding acknowledge signal to the second logic block indicating that the request has been received and the associated requested operation is being performed; and
   (e) speculative acknowledge logic included in the acknowledge logic that, in response to selected requests for which the first and second clocks are not in phase, returns a speculative acknowledge signal to the second logic block that is detected as an acknowledge signal;
   (f) the speculative acknowledge logic including rescue logic such that, if a request for which the speculative acknowledge logic returns a speculative acknowledge signal does not result in the corresponding performance of the associated requested operation by the first logic block by substantially the beginning of the next cycle of the first clock, then the rescue logic is operable to resubmit the request until the first logic block performs the associated requested operation.

2. A processor included in a computer system in which the processor is coupled to a bus that operates at a bus clock frequency, comprising:
   (a) a processor core and a bus controller coupled to the bus, the processor core selectively issuing bus cycle requests to the bus controller which in response issues associated bus cycles;
   (b) a clock generator that receives an input clock at the bus clock frequency, and generates a bc clock corresponding in frequency to the bus clock, and a core clock that is a ½X multiple of the bc clock, with each clock being characterized by defined clock edges such that the clocks are in phase when respective clock edges are synchronized and are out of phase when respective clock edges are not synchronized;
   (c) the bus controller operating with the bc clock, and the processor core operating with the core clock;
   (d) acknowledge logic in the bus controller coupled to receive a bus cycle request from the processor core, and to return a corresponding acknowledge signal to the processor core indicating that the bus cycle request has been received and the associated bus cycle is being run; and
   (e) speculative acknowledge logic included in the acknowledge logic that, in response to selected bus cycle requests for which the bc clock and the processor core clock are not in phase, returns a speculative acknowledge signal to the processor core that is detected as an acknowledge signal;

(f) the speculative acknowledge logic including rescue logic such that, if a bus cycle request for which the speculative acknowledge logic returns a speculative acknowledge signal does not result in a corresponding bus cycle being run by the bus controller by substantially the beginning of the next cycle of the bc clock, then the rescue logic is operable to resubmit the bus cycle request until the bus controller runs the associated bus cycle.

3. The processor of claim 2, further comprising prioritization logic, included in the rescue logic, responsive to a predefined priority bus cycle request to stall a pending resubmitted bus cycle request until the bus controller runs an associated priority bus cycle.

4. A computer system including a processor is coupled to a bus that operates at a bus clock frequency, the computer system comprising:

(a) a processor core and a bus controller coupled to the bus, the processor core selectively issuing bus cycle requests to the bus controller which in response issues associated bus cycles;

(b) a clock generator that receives an input clock at the bus clock frequency, and generates a bc clock corresponding in frequency to the bus clock, and a core clock that is a ½X multiple of the bc clock, with each clock being characterized by defined clock edges such that the clocks are in phase when respective clock edges are synchronized and are out of phase when respective clock edges are not synchronized;

(c) the bus controller operating with the bc clock, and the processor core operating with the core clock;

(d) acknowledge logic in the bus controller coupled to receive a bus cycle request from the processor core, and to return a corresponding acknowledge signal to the processor core indicating that the bus cycle request has been received and the associated bus cycle is being run; and (e) speculative acknowledge logic included in the acknowledge logic that, in response to selected bus cycle requests for which the bc clock and the processor core clock are not in phase, returns a speculative acknowledge signal to the processor core that is detected as an acknowledge signal;

(f) the speculative acknowledge logic including rescue logic such that, if a bus cycle request for which the speculative acknowledge logic returns a speculative acknowledge signal does not result in a corresponding bus cycle being run by the bus controller by substantially the beginning of the next cycle of the bc clock, then the rescue logic is operable to capture the bus cycle request until the bus controller runs the associated bus cycle.

5. The computer system of claim 4, further comprising prioritization logic, included in the rescue logic, responsive to a predefined priority bus cycle request to stall a pending resubmitted bus cycle request until the bus controller runs an associated priority bus cycle.

* * * * *